(12) United States Patent
Battle (10) Patent No.: US 7,184,062 B2
(45) Date of Patent: Feb. 27, 2007

(54) STATISTICALLY-BASED IMAGE BLENDING METHODS AND SYSTEMS FOR PASTING MULTIPLE DIGITAL SUB-IMAGES TOGETHER

(75) Inventor: Vianney Pierre Battle, Milwaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 107 days.

(21) Appl. No.: 10/753,127

(22) Filed: Jan. 7, 2004

(65) Prior Publication Data

US 2005/0146536 A1 Jul. 7, 2005

(51) Int. Cl.
*G09G 5/00* (2006.01)

(52) U.S. Cl. .............. 345/629; 345/639

(58) Field of Classification Search ........... 348/597, 348/584; 345/903, 592, 636, 629, 639, 634
See application file for complete search history.

(56) References Cited

U.S. PATENT DOCUMENTS

| | | | |
|---|---|---|---|
| 5,881,163 A * | 3/1999 | Slump et al. | 382/132 |
| 6,429,878 B1 * | 8/2002 | Turek et al. | 345/636 |
| 6,721,446 B1 * | 4/2004 | Wilensky et al. | 382/162 |
| 2005/0110802 A1 * | 5/2005 | Avinash | 345/629 |

\* cited by examiner

*Primary Examiner*—Kee M. Tung
*Assistant Examiner*—Michelle K. Lay
(74) *Attorney, Agent, or Firm*—Clements Walker; Christopher L. Bernard; Peter J. Vogel (57) ABSTRACT

Statistically-based image blending methods and systems for pasting a plurality of digital sub-images together into a single final pasted image are described herein. One embodiment comprises methods for blending a plurality of digital sub-images together into a single pasted image, comprising utilizing a statistically-based image blending technique to blend pixel intensities of at least two digital sub-images together to create a single pasted image thereof. In embodiments, the statistically-based image blending technique comprises utilizing the pixel intensities themselves, instead of utilizing only the locations of the pixel intensities, to blend the pixel intensities of the at least two digital sub-images together. Computer-readable mediums encoded with programming for blending a plurality of digital sub-images together into a single pasted image, and digital radiographic imaging systems comprising such programming, are also described.

20 Claims, 6 Drawing Sheets

STANDARD GEOMETRIC BLENDING

STATISTICALLY-BASED IMAGE BLENDING METHODS AND SYSTEMS FOR PASTING MULTIPLE DIGITAL SUB-IMAGES TOGETHER

FIELD OF THE INVENTION

The present invention relates generally to medical imaging. More specifically, the present invention relates to enhanced image blending of multiple digital sub-images to create a single, larger, final image therefrom, wherein informational, statistically-based blending is utilized to blend the sub-images together once they are registered.

BACKGROUND OF THE INVENTION

With applications ranging from diagnostic procedures to radiation therapy, the importance of high-performance medical imaging is immeasurable. As such, new advanced medical imaging technologies continue to be developed. Digital medical imaging represents the future of medical imaging. Digital imaging systems produce far more accurate and detailed images of an object than conventional film-based imaging systems, and also allow further enhancements of the images to be made once an object is scanned.

The flat panel digital radiographic imaging detectors available today typically have a maximum imaging size of about 40 cm×40 cm. Often times, an area of interest much larger than 40 cm×40 cm needs to be imaged. Therefore, several sub-images may need to be taken and pasted together to form a single, larger, final image of the desired area of interest. For example, if a 90 cm spinal image is desired, three separate sub-images need to be taken and combined into a single, larger, vertical, final image.

During the display processing to combine such sub-images, overlapping sub-images are registered and blended together. Currently, this blending comprises geometry-based blending, which utilizes the geometry of the acquired data only, not the acquired data itself. Geometry-based blending is less than ideal since it assumes that the overlapping images, once registered, both contain the same data and information. This is not always the case, such as for example, when collimator blades are present in one image, but not in another. There is no information contained in those pixels where the collimator blades appear in the image. In such cases, geometry-based blending will weigh pixels containing no information as if they actually contain information, which can cause artifacts of the collimator blades to appear in the final pasted image. Therefore, it would be desirable to have systems and methods that utilize statistically-based blending techniques instead, which utilize the actual acquired data from both images, not just the geometry thereof, to create high quality final images that are free of such artifacts.

SUMMARY OF THE INVENTION

Accordingly, the above-identified shortcomings of existing image blending methods for pasting multiple digital sub-images together are overcome by embodiments of the present invention, which relates to novel systems and methods that utilize statistically-based blending techniques to paste multiple digital sub-images together. These systems and methods utilize the actual acquired data from all the overlapping images, not just the geometry thereof, to improve the displayed image quality of the final pasted image.

Embodiments of this invention comprise methods for blending a plurality of digital sub-images together into a single pasted image. These methods may comprise utilizing a statistically-based image blending technique to blend pixel intensities of at least two digital sub-images together to create a single pasted image thereof. These methods may comprise the steps of: obtaining at least two digital sub-images of an imaged object; defining a pixel intensity at each pixel in each of the at least two digital sub-images; and utilizing a statistically-based image blending technique to blend the pixel intensities of the at least two digital sub-images together to create a single pasted image thereof.

Embodiments of this invention also comprise computer-readable mediums encoded with programming for blending a plurality of digital sub-images together into a single pasted image. This programming may be configured to: obtain at least two digital sub-images of an imaged object; define a pixel intensity at each pixel in each of the at least two digital sub-images; and utilize a statistically-based image blending technique to blend the pixel intensities of the at least two digital sub-images together to create a single pasted image thereof.

Embodiments of this invention also comprise digital radiographic imaging systems comprising: an x-ray source; an x-ray detector in operative communication with the x-ray source; and a statistically-based image blending system in operative communication with the x-ray detector, wherein the statistically-based image blending system comprises programming configured to: obtain at least two digital sub-images of an imaged object; define a pixel intensity at each pixel in each of the at least two digital sub-images; and utilize a statistically-based image blending technique to blend the pixel intensities of the at least two digital sub-images together to create a single pasted image thereof.

In embodiments, the statistically-based image blending technique may comprise utilizing the pixel intensities themselves, instead of utilizing only the locations of the pixel intensities, to blend the pixel intensities of the at least two digital sub-images together.

In embodiments, the statistically-based image blending technique may comprise utilizing the following relationship:

$$pixel_{pasted}(x, y) = \frac{p_1(x, y) * pixel_1(x, y)}{[p_1(x, y) + p_2(x, y)]} + \frac{p_2(x, y) * pixel_2(x, y)}{[p_1(x, y) + p_2(x, y)]}$$

wherein $pixel_{pasted}(x,y)$=the blended pixel intensity of the pasted sub-images, $p_1(x,y)$=probability that $pixel_1(x,y)$ contains actual information, and $p_2(x,y)$=probability that $pixel_2(x,y)$ contains actual information.

In embodiments, the statistically-based image blending technique may further comprise defining a probability function, $p(x,y)$, as a function of the pixel intensities in a first sub-image, $l_1(x,y)$, and as a function of the pixel intensities in a second sub-image, $l_2(x,y)$, wherein $p(x,y)=p'(l_1(x,y), l_2(x,y))$, and wherein $p'(l_1,l_2)$ has a high probability for $l_1<l_2$ and a low probability for $l_1>l_2$. The probability function, $p(x,y)$, may be utilized to determine the pixel intensity for each pixel in the first sub-image and the probability function, $1-p(x,y)$, may be utilized to determine the pixel intensity for each pixel in the second sub-image, and then the pixel intensities of the first sub-image and the pixel intensities of the second sub-image may be blended together accordingly to create the single pasted image thereof.

Embodiments may further comprise utilizing a low pass filter function to smooth $p(x,y)$ to remove the high frequency variation therein caused by pixel miscorrelation between the first sub-image and the second sub-image.

The single pasted image may comprise a plurality of digital sub-images that have been pasted together vertically, horizontally, two-dimensionally, three-dimensionally, and/or four-dimensionally.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

For the purposes of promoting an understanding of the invention, reference will now be made to some preferred embodiments of the present invention as illustrated in FIGS. 1–8 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention.

This invention relates to systems and methods for pasting multiple digital sub-images together to create a single, larger, final image therefrom. These systems and methods improve the displayed image quality of digital x-ray images by utilizing statistically-based blending, instead of geometry-based blending, to create the single final digital image. These systems and methods take into account the actual detected information, not just the geometry thereof, to blend the individual sub-images together. Therefore, when the overlapping areas of the individual sub-images do not contain the same information, the sub-image containing the best information can be used to create the gray scale of the final image so that the image quality thereof is optimized.

Figure 1:
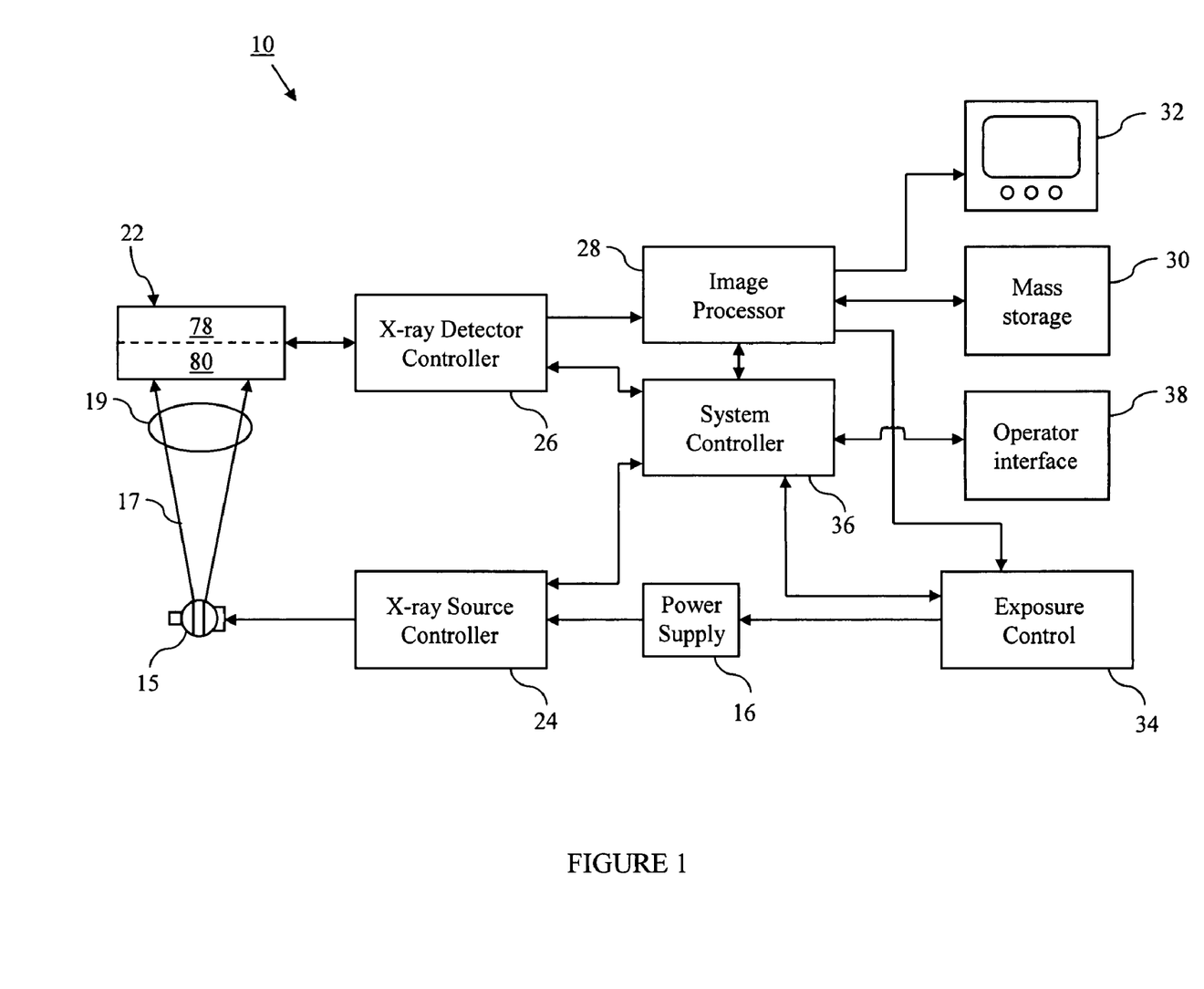
FIG. 1 is a schematic diagram showing the architecture of an exemplary digital x-ray imaging system, as utilized in embodiments of this invention.

Referring now to FIG. 1, a schematic diagram shows the architecture of one exemplary digital x-ray imaging system 10, as utilized in embodiments of this invention. Digital x-ray systems 10 generally comprise an x-ray source 15, an x-ray detector 22, an x-ray detector controller 26 that contains electronics for operating the x-ray detector 22, and an x-ray source controller 24 that contains electronics for operating the x-ray source 15. During operation, x-rays 17 are directed from the x-ray source 15 towards the x-ray detector 22, which may comprise a scintillator 80 and an amorphous silicon array 78. An overall system controller 36 provides power and timing signals to the x-ray source controller 24 and the x-ray detector controller 26, which then control the operation of the x-ray source 15 and x-ray detector 22, respectively. After passing through an object being imaged (i.e., a patient 19), the x-rays 17 fall upon the scintillator 80, which converts the x-ray photons therein to visible light. The visible light is then converted to an electrical charge by an array of photodiodes 41 in the amorphous silicon array 78. Each photodiode 41 is of large enough area to ensure it will intercept a sizeable portion of the visible light produced by the scintillator 80. Each photodiode 41 also has a relatively large capacitance that allows it to store the electrical charge that results from the photon excitation. A data acquisition system within x-ray detector controller 26 samples analog electrical charge data from the x-ray detector 22, and converts that analog data to digital signals for subsequent processing. The digital signals are then sent to an image processor 28, where the image is processed and enhanced. The processed image may then be displayed on a cathode ray tube display 32, or other suitable display, and/or the image can be stored in mass storage 30 for later retrieval. The image processor 28 can also produce a brightness control signal which can be applied to an exposure control circuit 34 to regulate the power supply 16, which can thereby regulate the x-ray source 15 through x-ray source controller 24. The overall operation of the x-ray system 10 may be governed by a system controller 36, which may receive commands and/or scanning parameters from an operator via operator interface 38. Operator interface 38 may comprise a keyboard, touchpad, or other suitable input device. An associated cathode ray tube display 32 (or other suitable display) may allow the operator to view the reconstructed image and other data from the image processor 28. The operator supplied commands and parameters may be used by the system controller 36 to provide control signals and information to the image processor 28, the x-ray detector controller 26, the x-ray source controller 24, and/or the exposure control circuit 34.

Embodiments of the present invention may make use of software or firmware running on the system controller 36 to carry out the processing of data and/or images in the methods and systems of this invention. A mouse, pointing device, or other suitable input device may be employed to facilitate the entry of data and/or image locations. Other embodiments of this invention may utilize a general purpose computer or workstation having a memory and/or printing capability for storing or printing images. Suitable memory devices are well known and include, but are not limited to, RAM, diskettes, hard drives, optical media, etc. Embodiments using stand-alone computers or workstations may receive data therefrom via conventional electronic storage media and/or via a conventional communications link, and images may then be reconstructed therefrom.

Figure 2:
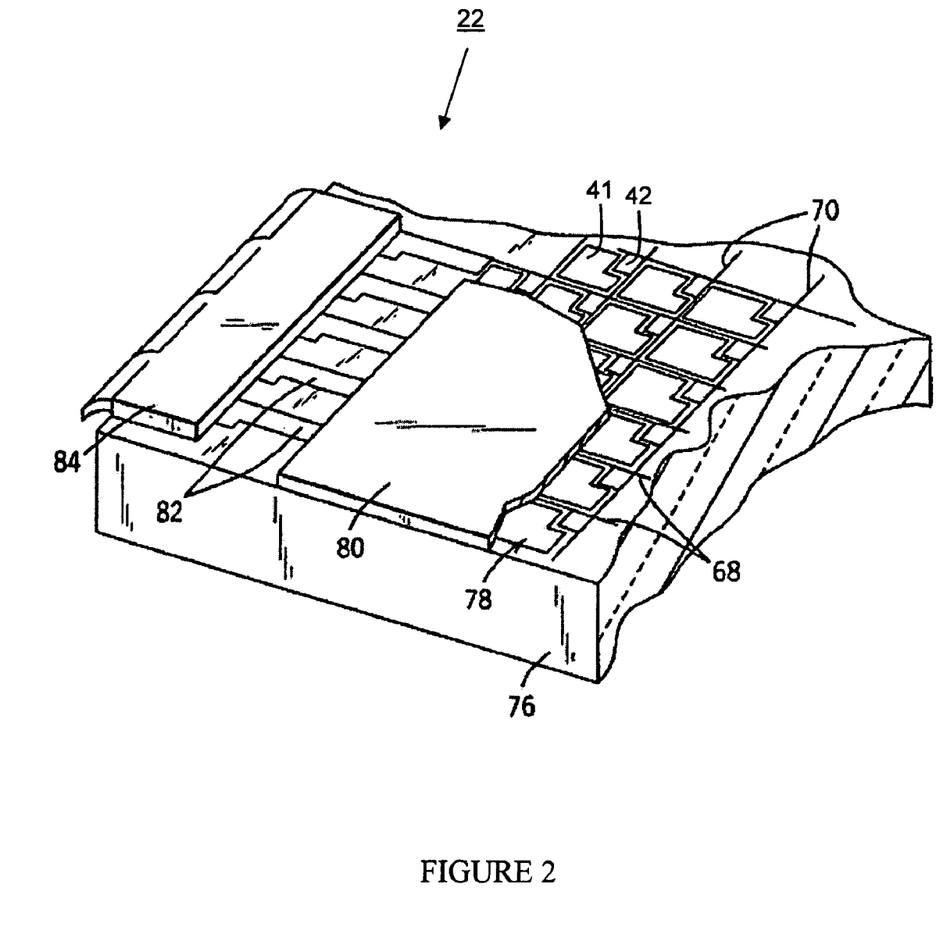
FIG. 2 is a schematic diagram showing the components of an exemplary single piece amorphous silicon flat panel, as utilized in embodiments of this invention.

Referring now to FIG. 2, there is shown one exemplary amorphous silicon flat panel x-ray detector 22, as utilized in embodiments of this invention. Generally, column electrodes 68 and row electrodes 70 are disposed on a single piece glass substrate 76, and an amorphous silicon array 78 is defined thereby. The amorphous silicon array 78 comprises an array of photodiodes 41 and field effect transistors (FETs) 42. A scintillator 80 is disposed over the amorphous silicon array 78, and is optically coupled thereto. The scintillator 80, which may comprise a dose-efficient cesium iodide scintillator, receives and absorbs x-ray radiation during operation, and converts the x-ray photons therein to visible light. The high fill factor amorphous silicon array 78, wherein each photodiode 41 therein represents a pixel, converts the detected visible light into an electrical charge. The charge at each pixel is then read out and digitized by low-noise electronics (via contact fingers 82 and contact leads 84), and is thereafter sent to an image processor 28.

Figure 3A:
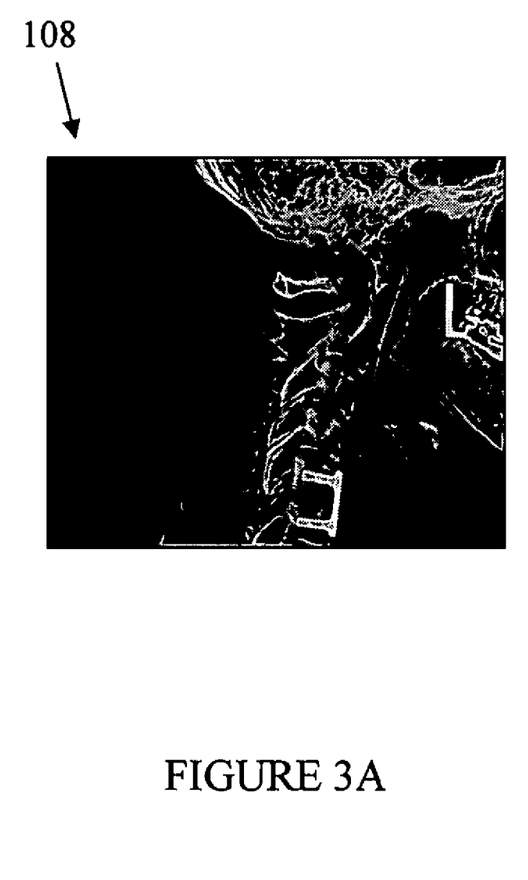
FIG. 3A is a digital sub-image of a top section of an area of interest.
Figure 3B:
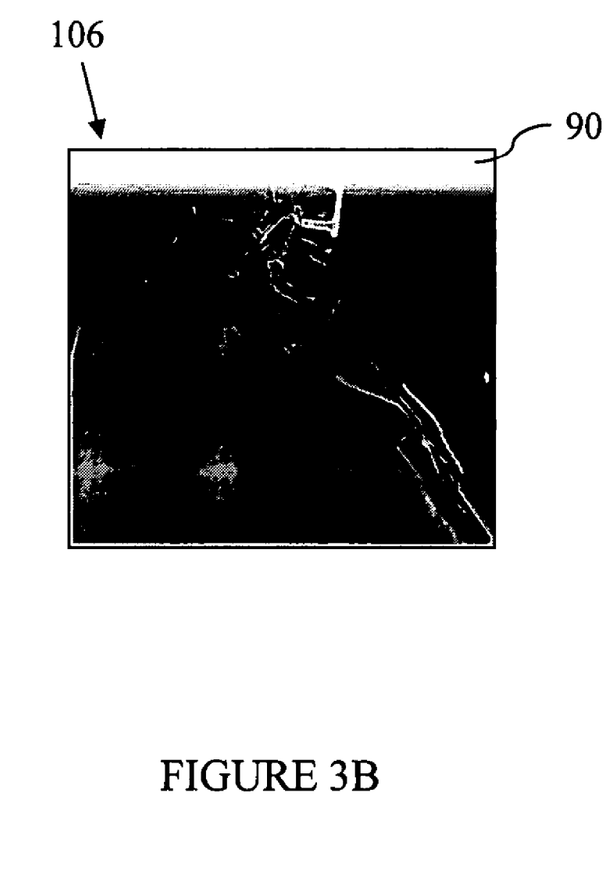
FIG. 3B is a digital sub-image of a bottom section of an area of interest having a collimator blade included therein.

FIG. 3A shows a digital sub-image of a top section of an area of interest, sub-image$_2$ 108, while FIG. 3B shows a digital sub-image of a bottom section of an area of interest, sub-image$_1$ 106. As can be seen in FIG. 3B, sub-image$_1$ 106 has a collimator blade 90 included along the top thereof. Often times, because of radiation issues, the amount of radiation a patient is exposed to is intentionally limited. Collimator blades may be used for limiting the areas of a patient that are exposed to the irradiation. For example, when an image of a human chest or spine is desired, a collimator blade may be used to cover the thyroid so that the thyroid is not irradiated during all the imaging scans. Generally, these collimator blades do not show up in the images. However, if the mechanics of the imaging system are not accurately calibrated and/or aligned, the collimator blade may show up a little along an edge or side of the image. This is not much of a problem when only a single image is taken because medical personnel are used to seeing these collimator blades along the sides or edges of an image. However, when multiple sub-images are pasted together to form a single, larger, final image, an artifact 92 of the collimator blade 90 may show up in the final image in an inappropriate and unacceptable location, such as in the middle of the two pasted sub-images, as shown in FIG. 5.

During the display processing and combining of such multiple sub-images, overlapping sub-images are first registered, and then blended. Currently, this blending is based on a combination of overlapping regions in two or more sub-images, where the combination is a function of the pixel location only. Typically, in the simplest case, the bottom rows of an upper sub-image and the top rows of a lower sub-image are weighted and blended together utilizing standard geometrical blending techniques.

Figure 4:
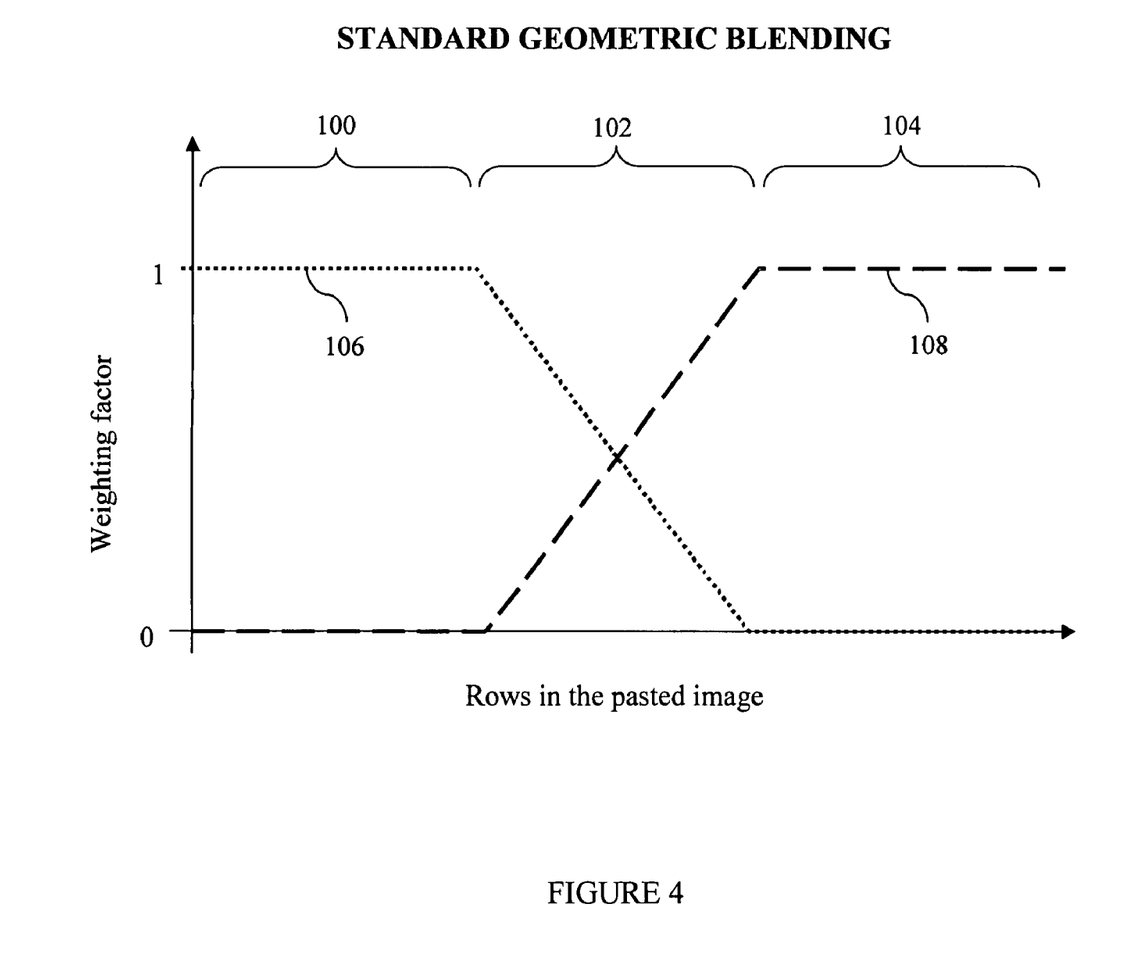
FIG. 4 is a graph showing the typical weighting of rows for two digital sub-images that are blended together via standard geometric blending techniques.
Figure 5:
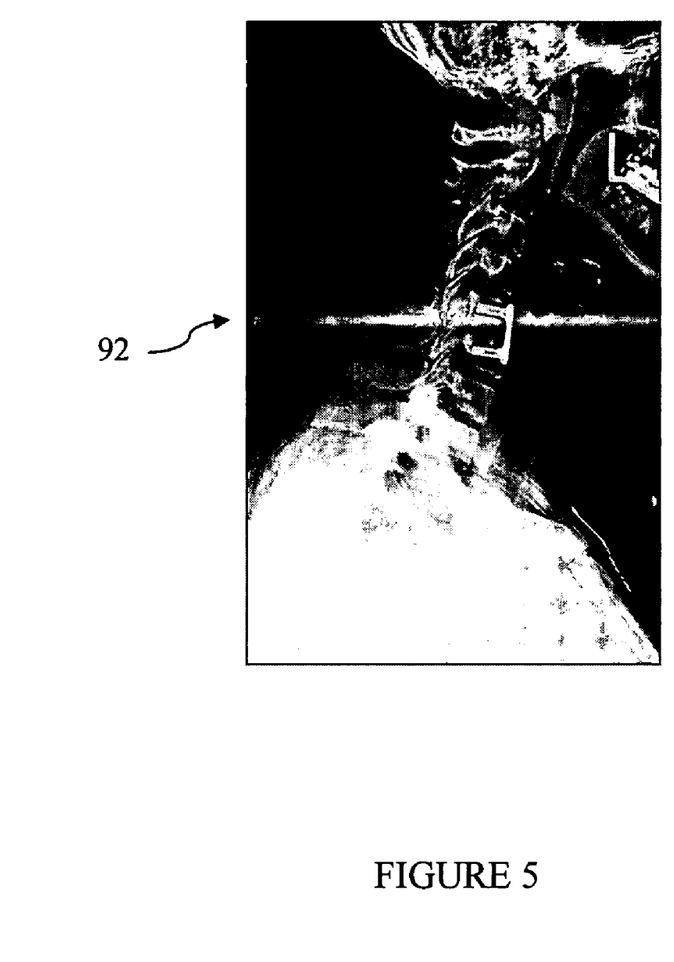
FIG. 5 is a processed digital image showing the two digital sub-images shown in FIGS. 3A and 3B blended and pasted together via standard geometrical blending techniques, wherein an artifact of the collimator blade is shown therein.

The two sub-images shown pasted together in FIG. 5 were blended and pasted together via standard geometrical blending techniques. Standard geometrical blending techniques typically weight the rows of the final combined image of the two sub-images by utilizing two inverse linear ramps, as shown in FIG. 4. For the rows in region 100, the pixels from sub-image$_1$ 106 are used since the two sub-images do not overlap in those rows. Similarly, for the rows in region 104, the pixels from sub-image$_2$ 108 are used since the two sub-images do not overlap in those rows either. However, when utilizing standard geometrical blending techniques, for the rows in the overlapping region 102 of the two sub-images, the gray level (i.e., pixel value) of each row in the final image will be selected based on a combination of the two respective pixels at the same locations in sub-image$_1$ 106 and sub-image$_2$ 108, and will obey the following relationship:

$$\text{pixel}_{pasted}(x,y)=[a(x,y)*\text{pixel}_1(x,y)]+[(1-a(x,y))*\text{pixel}_2(x,y)]$$

where a ranges from zero to one. In standard geometrical blending techniques, the weighting coefficient, a, is a function of the row (i.e., pixel location) only, as shown in FIG. 4, and the acquired pixel information itself is not taken into consideration. The standard logic here is that the further away you get from sub-image$_1$, the less that the pixels from sub-image$_1$ are going to count, and the more that the pixels from sub-image$_2$ are going to count, and vice versa. Such geometry-based blending techniques are less than ideal since they assume that the overlapping sub-images, once registered, both contain the same information. As previously mentioned, and as shown in FIGS. 3A and 3B, this is not always the case, such as for example, when collimator blades are present in one sub-image (i.e., FIG. 3B), but not in another (i.e., FIG. 3A). As shown in FIG. 3B, there is no information contained in the pixels in the rows where the collimator blades 90 are located. Therefore, using geometry-based blending to combine sub-image$_1$ and sub-image$_2$ will cause an artifact 92 of the collimator blades to appear in the final pasted image, as shown in FIG. 5. Therefore, it would be desirable to have systems and methods that utilize the actual acquired pixel information from both sub-images, not just the geometry thereof, to create high quality final images free of such processing-induced artifacts.

Figure 6:
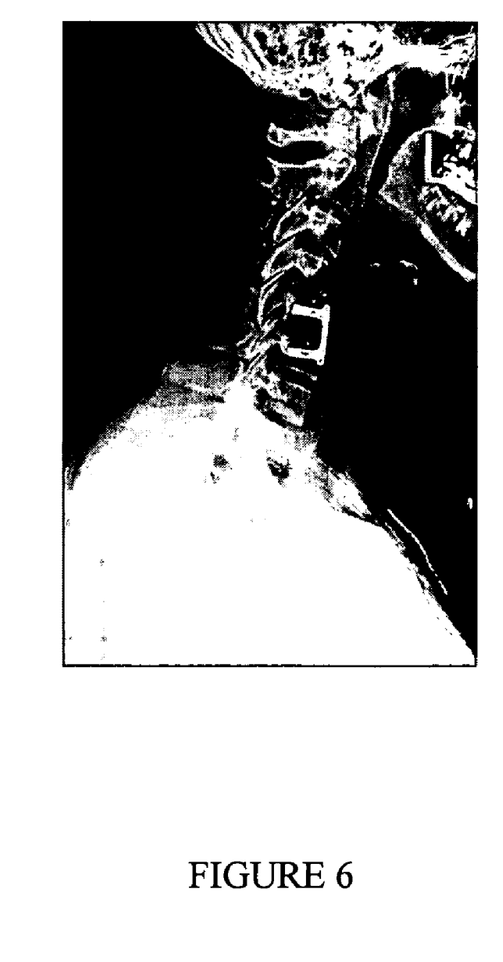
FIG. 6 is a processed digital image showing the two digital sub-images shown in FIGS. 3A and 3B blended and pasted together via the informational, statistically-based blending techniques of this invention, wherein no artifact of the collimator blade is shown therein.

Referring now to FIG. 6, the two sub-images shown in FIGS. 3A and 3B were blended and pasted together via the novel informational, statistically-based blending techniques of this invention. Here, the gray level of each row in the final image is defined as a confidence measure (i.e., as a function of the probability $p_1(x,y)$ that pixel$_1(x,y)$ contains actual information, and as a function of the probability $p_2(x,y)$ that pixel$_2(x,y)$ contains actual information) according to the following relationship:

$$\text{pixel}_{pasted}(x,y) = \frac{p_1(x,y)*\text{pixel}_1(x,y)}{[p_1(x,y)+p_2(x,y)]} + \frac{p_2(x,y)*\text{pixel}_2(x,y)}{[p_1(x,y)+p_2(x,y)]}$$

The systems and methods of this invention utilize the actual acquired pixel information from both sub-images, not just the geometry thereof, to create high quality final images free of processing-induced artifacts. The informational, statistically-based blending techniques of this invention are ideal since you actually know what the pixel information is from one sub-image, but not from the other, and these techniques take that information into account.

Figure 7:
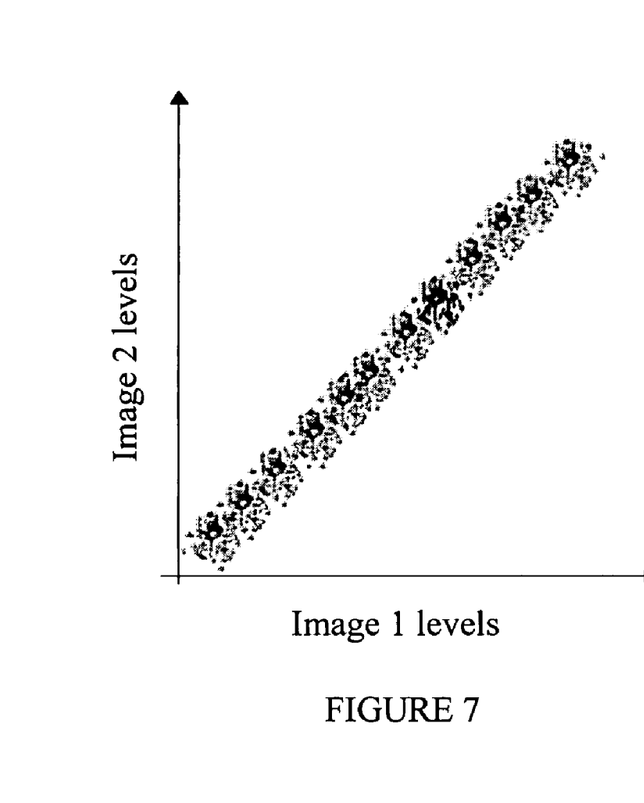
FIG. 7 is a mutual histogram of two digital sub-images having equally distributed information.

In some embodiments of this invention, $p_1(x,y)$ and $p_2(x,y)$ are based on the mutual histogram or scattergram shown in FIG. 7. In the particular case depicted in FIG. 7, both sub-images contain the same information in the overlapping region; a dark pixel in one sub-image is also a dark pixel in the other sub-image, and a light pixel in one sub-image is also a light pixel in the other sub-image. In other words, a gray level of about 10 in one sub-image corresponds to a gray level of about 10 in the other sub-image too. The two digital sub-images depicted here in FIG. 7 have equally distributed information, and thus, are not independent of one another. Since most of the pixels are alike in both of these sub-images, most of the populated pixels fall along the diagonal. In this case, the mutual histogram should have symmetrical properties and only a single probability function can be considered: $p_1(x,y)=p_2(x,y)=p$.

Figure 8:
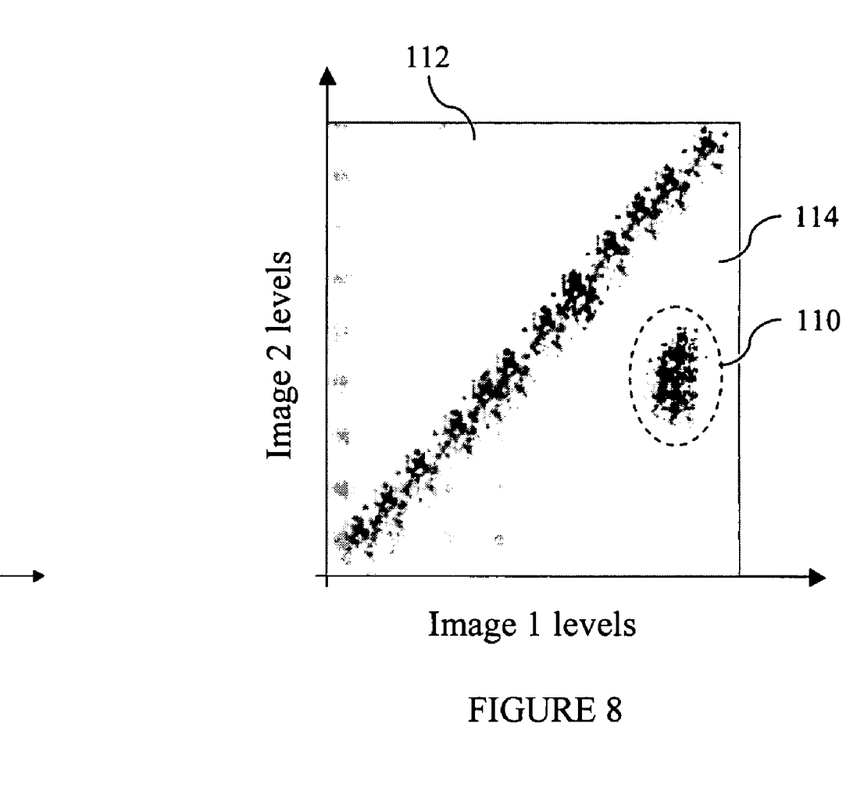
FIG. 8 is a mutual histogram of the two digital sub-images shown in FIGS. 3A and 3B, showing the corresponding probability functions, wherein the digital sub-image in FIG. 3B has a collimator blade shown therein.

In other embodiments, however, if only one of the two sub-images contains a collimator blade 90, the information contained in both sub-images is not the same, and the mutual histogram of the two sub-images looks more like that shown in FIG. 8, where a cluster of outlier pixels 110 appears for high gray levels in sub-image$_1$, corresponding to a range of average gray levels in sub-image$_2$. The outlier pixels 110 depicted here represent the collimator blade that is present in sub-image$_1$ 106 but not in sub-image$_2$ 108.

Based on the mutual histogram shown in FIG. 8, one can define a probability function, $p'(l_1,l_2)$, as a function of the gray levels in sub-image$_1$ 106 and sub-image$_2$ 108. Then, using the two sub-images, $l_1(x,y)$ and $l_2(x,y)$, it is easy to derive $p(x,y) = p'(l_1(x,y), l_2(x,y))$. In cases where the collimator appears in only one sub-image, one can assume that the collimator is characterized by gray levels significantly higher in one sub-image (i.e., sub-image$_1$) than in the other sub-image (i.e., sub-image$_2$), and thus derive $p(l_1, l_2)$ as a function of having a high probability for $l_1<l_2$ and a low probability for $l_1>l_2$. These probability functions are shown in FIG. 8, where the upper shaded area 112 (i.e., above and to the left of the diagonal) shows where there is a high probability that $l_1<l_2$, and the lower shaded area 114 (i.e., below and to the right of the diagonal) shows where there is a low probability that $l_1>l_2$. This probability function, p, is used for pixels in sub-image$_1$ 106, while the probability function, 1–p, is used for pixels in sub-image$_2$ 108. These probability functions are then applied to each pixel in each image to blend the two sub-images together. In this manner, the pixels in the final pasted image that correspond to the area where the collimator blade appears in sub-image$_1$ 106 are derived essentially completely from the pixels in that same region from sub-image$_2$ 108 where there is no collimator blade shown.

Spatial frequency functions that are derived from mutual histograms such as that shown in FIG. 8 are likely to contain a lot of high spatial frequency that can lead to visual artifacts in the final images created therefrom. This is due to the non-correlation, on a pixel-by-pixel basis, between sub-image$_1$ 106 and sub-image$_2$ 108. In order to compensate for this effect, p(x,y) can be smoothed with a low pass filter function, which will remove the high frequency variation due to the pixel miscorrelation between sub-image$_1$ 106 and sub-image$_2$ 108.

As described above, this invention provides systems and methods for pasting multiple digital sub-images together to create a single, larger, final image therefrom. Advantageously, these systems and methods utilize statistically-based blending, instead of geometry-based blending, to create the final images, thereby resulting in final images that are substantially free of processing-induced artifacts. Additionally, these systems and methods can paste multi-dimensional images together by utilizing both vertical and horizontal pasting, thereby allowing much larger final images to be obtained than currently possible. For example, while the embodiments described in detail herein pasted two sub-images together vertically to create a long vertical final image, this invention could additionally or alternatively paste multiple sub-images horizontally together to create a wider horizontal and/or square or rectangular shaped final image. For example, four sub-images may be pasted together in the form of a 2×2 matrix to form a square final image; or six sub-images may be pasted together in the form of a 2×3 matrix to form a rectangular final image, etc. Additionally, while the description herein describes pasting together multiple two dimensional images, this invention can easily be utilized to paste together multiple three dimensional images or volumes, such as those created via computed tomography or magnetic resonance imaging, and can even be utilized to paste together multiple four dimensional images or time varying volumes, such as those created via ultrasound, and all such embodiments are intended to be covered within the scope of the appended claims and their equivalents. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method for blending a plurality of digital sub-images together into a single pasted image, comprising utilizing a statistically-based image blending technique to blend pixel intensities of at least two digital sub-images together to create a single pasted image thereof; wherein the statistically-based image blending technique comprises utilizing the following relationship:

$$pixel_{pasted}(x, y) = \frac{p_1(x, y) * pixel_1(x, y)}{[p_1(x, y) + p_2(x, y)]} + \frac{p_2(x, y) * pixel_2(x, y)}{[p_1(x, y) + p_2(x, y)]}$$

wherein $pixel_{pasted}(x,y)$ is the blended pixel intensity of the pasted sub-images, $p_1(x,y)$ is the probability that a $pixel_1(x,y)$ contains information, and $p_2(x,y)$ is the probability that a $pixel_2(x,y)$ contains information;

wherein $pixel_1(x,y)$ is a pixel intensity on a first sub-image at predetermined (x,y) coordinates and $pixel_2(x,y)$ is a pixel intensity on a second sub-image at predetermined (x,y) coordinates; and wherein the plurality of digital sub-images are original, non-processed images pasted together into the single pasted image; and displaying the single pasted image to a user.

2. The method of claim 1, wherein the single pasted image comprises a plurality of digital sub-images that have been pasted together in at least one of these manners: vertically, horizontally, two-dimensionally, three-dimensionally, and four-dimensionally.

3. The method of claim 1, wherein the statistically-based image blending technique further comprises defining a probability function, p(x,y), as a probability function, $p'(l_1,l_2)$, of the pixel intensities in a first sub-image, $l_1(x,y)$, and as a function of the pixel intensities in a second sub-image, $l_2(x,y)$, wherein $p(x,y)=p'(l_1(x,y),l_2(x,y))$, and wherein $p'(l_1,$ $l_2$) has a relatively higher probability for $l_1<l_2$ than for $l_1>l_2$ for a first sub-image containing significantly higher gray levels.

4. The method of claim 3, wherein the probability function, p(x,y), is utilized to determine the pixel intensity for each pixel in the first sub-image and the probability function, 1−p(x,y), is utilized to determine the pixel intensity for each pixel in the second sub-image, and then the pixel intensities of the first sub-image and the pixel intensities of the second sub-image are blended together accordingly to create the single pasted image thereof.

5. The method of claim 4, further comprising smoothing p(x,y) to remove the high frequency variation therein caused by pixel miscorrelation between the first sub-image and the second sub-image.

6. A method for blending a plurality of digital sub-images together into a single pasted image, comprising the steps of:
   obtaining at least two digital sub-images of an imaged object;
   defining a pixel intensity at each pixel in each of the at least two digital sub-images;
   utilizing a statistically-based image blending technique to blend the pixel intensities of the at least two digital sub-images together to create a single pasted image thereof;
   wherein the statistically-based image blending technique comprises utilizing the following relationship:

$$pixel_{pasted}(x, y) = \frac{p_1(x, y) * pixel_1(x, y)}{[p_1(x, y) + p_2(x, y)]} + \frac{p_2(x, y) * pixel_2(x, y)}{[p_1(x, y) + p_2(x, y)]}$$

wherein $pixel_{pasted}(x,y)$ is the blended pixel intensity of the pasted sub-images, $p_1(x,y)$ is the probability that a $pixel_1(x,y)$ contains information, and $p_2(x,y)$ is the probability that a $pixel_2(x,y)$ contains information;
   wherein $pixel_1(x,y)$ is a pixel intensity on a first sub-image at predetermined (x,y) coordinates and $pixel_2(x,y)$ is a pixel intensity on a second sub-image at predetermined (x,y) coordinates; and
   wherein the plurality of digital sub-images are original, non-processed images pasted together into the single pasted image; and
   displaying the single pasted image to a user.

7. The method of claim 6, wherein the single pasted image comprises a plurality of digital sub-images that have been pasted together in at least one of these manners: vertically, horizontally, two-dimensionally, three-dimensionally and four-dimensionally.

8. The method of claim 6, wherein the statistically-based image blending technique further comprises defining a probability function, p(x,y), as a probability function, $p'(l_1,l_2)$, of the pixel intensities in a first sub-image, $l_1(x,y)$, and as a function of the pixel intensities in a second sub-image, $l_2(x,y)$, wherein $p(x,y)=p'(l_1(x,y),l_2(x,y))$, and wherein $p'(l_1,l_2)$ has a relatively higher probability for $l_1<l_2$ than for $l_1>l_2$ for a first sub-image containing significantly higher gray levels.

9. The method of claim 8, wherein the probability function, p(x,y), is utilized to determine the pixel intensity for each pixel in the first sub-image and the probability function, 1−p(x,y), is utilized to determine the pixel intensity for each pixel in the second sub-image, and then the pixel intensities of the first sub-image and the pixel intensities of the second sub-image are blended together accordingly to create the single pasted image thereof.

10. The method of claim 9, further comprising smoothing p(x,y) to remove the high frequency variation therein caused by pixel miscorrelation between the first sub-image and the second sub-image.

11. A computer-readable medium encoded with programming for blending a plurality of digital sub-images together into a single pasted image, the programming configured to:
   obtain at least two digital sub-images of an imaged object;
   define a pixel intensity at each pixel in each of the at least two digital sub-images; and
   utilize a statistically-based image blending technique to blend the pixel intensities of the at least two digital sub-images together to create a single pasted image thereof;
   wherein the statistically-based image blending technique comprises utilizing the following relationship:

$$pixel_{pasted}(x, y) = \frac{p_1(x, y) * pixel_1(x, y)}{[p_1(x, y) + p_2(x, y)]} + \frac{p_2(x, y) * pixel_2(x, y)}{[p_1(x, y) + p_2(x, y)]}$$

wherein $pixel_{pasted}(x,y)$ is the blended pixel intensity of the pasted sub-images, $p_1(x,y)$ is the probability that a $pixel_1(x,y)$ contains information, and $p_2(x,y)$ is the probability that a $pixel_2(x,y)$ contains information;
   wherein $pixel_1(x,y)$ is a pixel intensity on a first sub-image at predetermined (x,y) coordinates and $pixel_2(x,y)$ is a pixel intensity on a second sub-image at predetermined (x,y) coordinates; and
   wherein the plurality of digital sub-images are original, non-processed images pasted together into the single pasted image.

12. The computer-readable medium of claim 11, wherein the single pasted image comprises a plurality of digital sub-images that have been pasted together in at least one of these maimers: vertically, horizontally, two-dimensionally, three-dimensionally and four-dimensionally.

13. The computer-readable medium of claim 11, wherein the statistically-based image blending technique further comprises defining a probability function, p(x,y), as a probability function, $p'(l_1,l_2)$, of the pixel intensities in a first sub-image, $l_1(x,y)$, and as a function of the pixel intensities in a second sub-image, $l_2(x,y)$, wherein $p(x,y)=p'(l_1(x,y),l_2(x,y))$, and wherein $p'(l_1,l_2)$ has a relatively higher probability for $l_1<l_2$ than for $l_1>l_2$ for a first sub-image containing significantly higher gray levels.

14. The computer-readable medium of claim 13, wherein the probability function, p(x,y), is utilized to determine the pixel intensity for each pixel in the first sub-image and the probability function, 1−p(x,y), is utilized to determine the pixel intensity for each pixel in the second sub-image, and then the pixel intensities of the first sub-image and the pixel intensities of the second sub-image are blended together accordingly to create the single pasted image thereof.

15. The computer-readable medium of claim 14, further comprising smoothing p(x,y) to remove the high frequency variation therein caused by pixel miscorrelation between the first sub-image and the second sub-image.

16. A digital radiographic imaging systems comprising:
   an x-ray source;
   an x-ray detector in operative communication with the x-ray source; and
   a statistically-based image blending system in operative communication with the x-ray detector,
   wherein the statistically-based image blending system comprises programming configured to:

obtain at least two digital sub-images of an imaged object;

define a pixel intensity at each pixel in each of the at least two digital sub-images; and utilize a statistically-based image blending technique to blend the pixel intensities of the at least two digital sub-images together to create a single pasted image thereof;

wherein the statistically-based image blending technique comprises utilizing the following relationship:

$$pixel_{pasted}(x, y) = \frac{p_1(x, y) * pixel_1(x, y)}{[p_1(x, y) + p_2(x, y)]} + \frac{p_2(x, y) * pixel_2(x, y)}{[p_1(x, y) + p_2(x, y)]}$$

wherein $pixel_{pasted}(x,y)$ is the blended pixel intensity of the pasted sub-images, $p_1(x,y)$ is the probability that a $pixel_1(x,y)$ contains information, and $p_2(x,y)$ is the probability that a $pixel_2(x,y)$ contains information;

wherein $pixel_1(x,y)$ is a pixel intensity on a first sub-image at predetermined (x,y) coordinates and $pixel_2(x,y)$ is a pixel intensity on a second sub-image at predetermined (x,y) coordinates; and wherein the plurality of digital sub-images are original, non-processed images pasted together into the single pasted image.

17. The digital radiographic imaging system of claim 16, wherein the single pasted image comprises a plurality of digital sub-images that have been pasted together in at least one of these manners: vertically, horizontally, two-dimensionally, three-dimensionally and four-dimensionally.

18. The digital radiographic imaging system of claim 16, wherein the statistically-based image blending technique further comprises defining a probability function, p(x,y), as a probability function, $p'(l_1,l_2)$, of the pixel intensities in a first sub-image, $l_1(x,y)$, and as a function of the pixel intensities in a second sub-image, $l_2(x,y)$, wherein $p(x,y)=p'(l_1(x,y),l_2(x,y))$, and wherein $p'(l_1,l_2)$ has a relatively higher probability for $l_1<l_2$ than for $l_1>l_2$ for a first sub-image containing significantly higher gray levels.

19. The digital radiographic imaging system of claim 18, wherein the probability function, p(x,y), is utilized to determine the pixel intensity for each pixel in the first sub-image and the probability function, 1−p(x,y), is utilized to determine the pixel intensity for each pixel in the second sub-image, and then the pixel intensities of the first sub-image and the pixel intensities of the second sub-image are blended together accordingly to create the single pasted image thereof.

20. The digital radiographic imaging system of claim 19, further comprising smoothing p(x,y) to remove the high frequency variation therein caused by pixel miscorrelation between the first sub-image and the second sub-image.

* * * * *